US007150804B2

(12) United States Patent
Tajima

(10) Patent No.: US 7,150,804 B2
(45) Date of Patent: Dec. 19, 2006

(54) METHOD FOR DISASSEMBLING IMAGE DISPLAY APPARATUS, METHOD FOR PRODUCING IMAGE DISPLAY APPARATUS, METHOD FOR PRODUCING SUPPORT MEMBER, METHOD FOR PRODUCING IMAGE DISPLAY UNIT, METHOD FOR PRODUCING WORKING MATERIAL, AND IMAGE DISPLAY APPARATUS

(75) Inventor: Hisao Tajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 10/322,620

(22) Filed: Dec. 19, 2002

(65) Prior Publication Data

US 2003/0121601 A1 Jul. 3, 2003

(30) Foreign Application Priority Data

| | | | |
|---|---|---|---|
| Dec. 25, 2001 | (JP) | ............................. | 2001/391644 |
| Jan. 28, 2002 | (JP) | ............................. | 2002/018493 |
| Dec. 16, 2002 | (JP) | ............................. | 2002/363559 |

(51) Int. Cl.
*B32B 38/10* (2006.01)

(52) U.S. Cl. .......................... 156/344; 156/584; 445/2; 29/426.4; 29/762

(58) Field of Classification Search ................ 156/344, 156/584; 445/2; 29/426.4, 402.03, 762
See application file for complete search history.

(56) References Cited

U.S. PATENT DOCUMENTS

| | | | | |
|---|---|---|---|---|
| 3,190,785 | A * | 6/1965 | Comet | 156/584 |
| 5,525,183 | A * | 6/1996 | Baley | 156/344 |
| 5,976,307 | A * | 11/1999 | Cook, Jr. | 156/344 |
| 6,233,497 | B1 | 5/2001 | Kachi et al. | 700/173 |
| 6,288,489 | B1 | 9/2001 | Isohata et al. | 313/582 |
| 6,409,562 | B1 * | 6/2002 | Asano et al. | 445/2 |
| 6,632,113 | B1 * | 10/2003 | Noma et al. | 445/2 |
| 2002/0043916 | A1 * | 4/2002 | Juen | 313/44 |
| 2000/0067591 | | 6/2002 | Tajima | 361/681 |
| 2003/0230381 | A1 * | 12/2003 | Watanabe | 156/250 |

FOREIGN PATENT DOCUMENTS

| | | |
|---|---|---|
| CN | 1307323 | 8/2001 |
| EP | 0 821 385 | 1/1998 |
| JP | 62-208525 | 9/1987 |
| JP | 7-29496 | 1/1995 |
| JP | 7-45198 | 2/1995 |
| JP | 10-232625 | 9/1998 |
| JP | 11-119678 | 4/1999 |
| JP | 11-272182 | 10/1999 |
| JP | 2000-310955 | 11/2000 |
| JP | 2000-321989 | 11/2000 |
| JP | 2002-50294 | 2/2002 |
| KR | 2001-0099641 | 11/2001 |

* cited by examiner

*Primary Examiner*—Mark A. Osele
(74) *Attorney, Agent, or Firm*—Fitzpatrick, Cella, Harper & Scinto

(57) ABSTRACT

A method for disassembling an image display apparatus in which an image display unit including an internal space and a support member for supporting the image display unit are adhered by an adhesive member includes the step of separating the image display unit and the support member. The separating step includes a step of inserting a substance between the image display unit and the support member.

9 Claims, 12 Drawing Sheets

METHOD FOR DISASSEMBLING IMAGE DISPLAY APPARATUS, METHOD FOR PRODUCING IMAGE DISPLAY APPARATUS, METHOD FOR PRODUCING SUPPORT MEMBER, METHOD FOR PRODUCING IMAGE DISPLAY UNIT, METHOD FOR PRODUCING WORKING MATERIAL, AND IMAGE DISPLAY APPARATUS

BACKGROUND OF THE INVENTION

1. Field of the Invention

The present invention relates to a method of disassembling an image display apparatus including an image display unit and a support member adhered by an adhesion member, a method of producing such an image display apparatus, a method of producing such a support member, a method of producing an image display unit, a method of producing a working material, and an image display apparatus.

2. Related Background Art

Thin flat-panel image display apparatus, such as an image display apparatus utilizing an electron emission device, utilizing a plasma discharge, utilizing a liquid crystal, utilizing a fluorescent display device and the like, are already used in various applications such as a television, a computer terminal, an advertising medium and a sign. Particularly in recent years, attention is being paid to a wall-hanging television of an image size of 40 inches or larger, which fully exploits the advantages of a thin image display apparatus. Such image display apparatus is basically composed of an image display unit, an electrical circuit unit, a support member for supporting these units, and an enveloping unit. For supporting the image display unit, there is generally employed a structure of adhering the image display unit to a support member by a double sticking tape.

A prior technology relating to the present invention is described for example in Japanese Patent Application Laid-Open No. 11-119678 on an image display apparatus.

FIG. 13 is a perspective view showing a prior image display apparatus in a disassembled state.

The prior image display apparatus is provided with a display panel (image display unit) 60 which forms an enclosed space by opposing two glass substrates (not shown) bearing electric wirings, a frame chassis (support member) 61 opposed to the rear face of the display panel 60 for supporting the display panel 60 and having an electrical mounting area on a rear surface, and a double sticking tape 62 for adhering the glass substrate (not shown) at the rear side of the display panel 60 and the frame chassis 61. On the frame chassis 61, there is fixed a circuit board 63 for electric power supply and signal processing for driving and controlling the light emission of the display panel 60, by fixing means such as screws.

These internal components, including the display panel 60, are accommodated in a space formed by a rear casing (cover) 64 and a front casing 65 for protecting the internal components. The front casing 65 is provided in a central portion with an aperture for an image display area, and, in such aperture, there is mounted a translucent member (not shown) for showing an image displayed on the display panel 60 to the exterior while protecting the internal components.

Also Japanese Patent Applications Laid-Open Nos. 11-272182 and 2002-050294 disclose a PDP (plasma display panel) as an image display apparatus.

Also Japanese Patent Applications Laid-Open Nos. 11-119678 and 2000-321989 are known to disclose technologies relating to the image display apparatus.

SUMMARY OF THE INVENTION

The present invention discloses a novel method for disassembling an image display apparatus, and a novel method for producing an image display apparatus.

The present application discloses an invention, as a novel method of disassembling an image display apparatus, by inserting a substance between a display unit and a support member thereby causing separation thereof, an invention of applying a force for separating the display unit and the support member through a hole provided in the support member, and a producing method utilizing such inventions.

DESCRIPTION OF THE PREFERRED EMBODIMENTS

Figure 1:
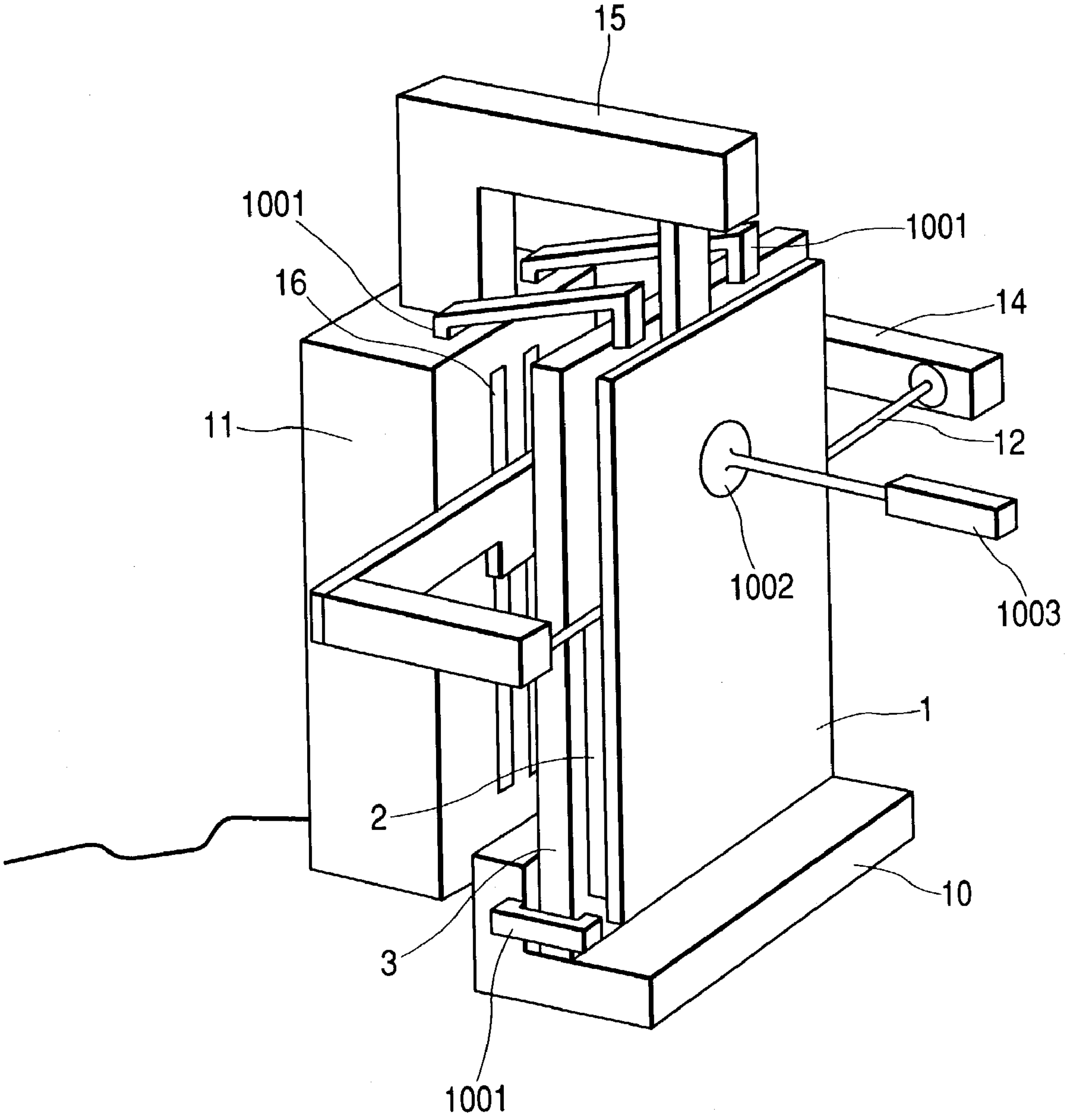
FIG. 1 is a perspective view showing an image display apparatus constituting a first embodiment of the present invention, and a disassembling apparatus for disassembling the image display apparatus.

An invention of a disassembling method of the present invention provides a disassembling method for an image display apparatus in which an image display unit including an internal space and a support member for supporting the image display unit are adhered by an adhering member, the method including:

a step of separating the image display unit and the support member, wherein the separating step includes a step of inserting a substance between the image display unit and the support member.

In this method, there can be advantageously employed a configuration in which the adhering member is cut by an insertion of the above-mentioned substance.

Also there can be particularly advantageously employed a configuration in which the substance comes into contact with the adhering member thereby cutting the adhering member.

Also there can be advantageously employed a configuration in which the substance is a solid.

For the step of inserting the substance, there can be employed, for example, a step of inserting a linear member. There may also be employed a cutting blade. There can be advantageously employed a configuration in which the substance to be inserted is inserted in a heated state. For example, there can be advantageously employed a configuration in which the substance to be inserted is constituted by a material capable of heat generation by a supply of an electric current, and the inserting step is executed under a supply of an electric current.

Also there can be advantageously employed a configuration in which the substance to be inserted is constituted by a longitudinally elongated member provided with a cutting blade functioning in the longitudinal direction of the member and positioned along such longitudinal direction, and the longitudinally elongated member is inserted under a reciprocating motion in the longitudinal direction.

Also there can be advantageously employed a configuration in which the substance to be inserted is constituted by a longitudinally elongated member provided with a cutting blade functioning in the circumferential direction of the member and positioned along the longitudinal direction of the member, and the longitudinally elongated member is inserted under a rotating motion about an axis thereof.

Also there can be advantageously adopted a configuration in which said substance is a liquid. The liquid can be water or a solvent. More specifically, as the aforementioned step of inserting the substance, there can be employed a step of ejecting a liquid to the adhering member.

Also there can be advantageously employed a configuration in which the substance is a substance capable of softening the adhering member.

Also there can be advantageously employed a configuration in which a cutting by a solid-substance and a softening of the adhering member by a solvent are executed in combination.

Also for supplying the adhering member with a solvent, it is advantageous to contact or impregnate the adhering member with the solvent through plural penetrating holes which are provided in the support member, in advance or prior to the solving supplying step, from a surface opposed to the display unit to a surface at the opposite side.

Also the aforementioned separating step advantageously includes a step of applying a force, in a direction of separating the display unit and the support member, to at least either of the display unit and the support member. This step and the aforementioned step of inserting the substance may be executed at the same time or with a delay in time, and the force in the direction of separating the display unit and the support member may be caused to be applied by the insertion of the aforementioned substance.

Also there may be advantageously adopted a configuration in which the aforementioned force in the separating direction is applied by another separating means different from the substance to be inserted. More specifically, the aforementioned force in the separating direction can be provided by inserting a member, having a portion of a larger width than in a leading end portion to be inserted, as the aforementioned separating means. More specifically, there can be employed a wedge-shaped member of which width gradually increases from a front end to be inserted toward a rear end side. In case of cutting the adhering member by the insertion of the substance and applying the force of the separating direction by the insertion of another separating means different from the substance, it is desirable that the inserting direction of the substance for cutting and the inserting direction of the separating means are approximately parallel.

Also as a configuration for applying the force in the separating direction, there can be employed a configuration of executing a suction on either of the support member and the display unit, thereby separating it from the other or separating the other. More specifically, there is employed a suction cup which is attracted by suction to either of the image display unit and the support member, and the force in the separating direction can be applied by fixing the image display unit or the support member to which the suction cup is not attached and by pulling the suction cup. The pulling direction of the suction cup is desirably substantially perpendicular to the surface of the image display unit or of the support member.

Also, in case of a rectangular image display apparatus, the inserting direction of the substance is desirably substantially parallel to a longer side of the rectangular shape.

The disassembling method described herein may be employed in a configuration in which the image display apparatus is in a standing position, or in a configuration in which the image display apparatus is in a horizontally lying state. In case of execution in a horizontally lying state, the method may be executed in a case where the image display unit is positioned on the support member or in a case where the support member is positioned on the image display unit.

Also an invention of a disassembling method of the present invention provides a disassembling method for an image display apparatus in which an image display unit and a support member for supporting the image display unit are adhered by an adhering member, the method including:

a step of separating the image display unit and the support member, wherein the separating step includes a step of pressing the image display unit in a direction separating from the support member, through an aperture provided in the support member from a surface thereof opposed to the image display unit to an opposite surface.

Such aperture is preferably provided in plural units.

More specifically, the pressing step can be executed by a member inserted in the aforementioned aperture.

For example, by fixing the support member and inserting a movable member into the aperture, there can be generated a force between the support member and the display unit in a mutually separating direction. A separation can be achieved in a similar manner by fixing a member inserted or to be inserted into the aperture and moving the support member. Therefore, the pressing of the image display unit in the direction separating from the support member includes not only a configuration of fixing the support member and moving the position of the image display unit with respect to the support member in a direction separating therefrom, but also a configuration of moving the position of the support member with respect to the display unit.

In a configuration of pressing the image display unit through plural apertures in the direction separating from the support member, it is preferable to employ, as a member corresponding to the plural apertures, a member of which a height of the member pressing a vicinity of a side (particularly a shorter side) of the image display unit is different from a height of the member pressing a vicinity of an opposed side, particularly a member of which the height is gradually lowered from a side to the other side.

In the configurations mentioned in the foregoing, a sticking member can be advantageously employed as the adhering member. In particular, there can be advantageously employed a double sticking tape, formed by coating a sticking material on both surfaces of a base material. Fixation may also be achieved by coating a liquid adhesive material directly on the support member or the display unit.

Also in the above-mentioned configurations, it is desirable to execute the separating step under heating of the adhering member. As explained in the foregoing, there may be employed a configuration of heating through the substance to be inserted, a configuration of heating an atmosphere in a separating chamber or a separating apparatus, or a configuration of employing heating by an irradiation of an electromagnetic wave (light or infrared ray) from the exterior.

Also the present invention provides a method for producing a support member, including a step of separating an image display unit and a support member in an image display apparatus in which the image display unit including an internal space and the support member for supporting the image display unit are adhered by an adhering member, wherein the separating step includes a step of inserting a substance between the image display unit and the support member.

There is also provided a method for producing an image display unit, including a step of separating an image display unit and a support member in an image display apparatus in which the image display unit including an internal space and the support member for supporting the image display unit are adhered by an adhering member, wherein the separating step includes a step of inserting a substance between the image display unit and the support member.

There is also provided a method for producing a support member, including a step of separating an image display unit and a support member in an image display apparatus in which the image display unit including an internal space and the support member for supporting the image display unit are adhered by an adhering member, wherein the separating step includes a step of pressing the image display unit in a direction separating from the support member, through an aperture provided in the support member from a surface thereof opposed to the image display unit to an opposite surface.

There is also provided a method for producing an image display unit, including a step of separating an image display unit and a support member in an image display apparatus in which the image display unit including an internal space and the support member for supporting the image display unit are adhered by an adhering member, wherein the separating step includes a step of pressing the image display unit in a direction separating from the support member, through an aperture provided in the support member from a surface thereof opposed to the image display unit to an opposite surface.

There is also provided a method for producing an image display apparatus including:

a step A of preparing an image display unit;

a step B of obtaining a support member by any of the aforementioned disassembling methods; and a step of combining the image display unit prepared in the step A and the support member obtained in the step B.

There is also provided a method for producing an image display apparatus including:

a step A of preparing a support member;

a step B of obtaining an image display unit by any of the aforementioned disassembling methods; and a step of combining the support member prepared in the step A and the image display unit obtained in the step B.

There is also provided a method for producing an image display apparatus including:

a step of obtaining an image display unit and a support member by any of the aforementioned disassembling methods; and a step of combining the image display unit and the support member obtained in the foregoing step.

There is also provided a method for producing a working material, including:

a step of obtaining a support member by any of the aforementioned disassembling methods; and a step of rendering easily workable the support member obtained by the aforementioned step.

There is also provided a method for producing a working material, including:

a step of obtaining an image display unit by any of the aforementioned disassembling methods; and a step of rendering easily workable the support member obtained by the aforementioned step.

Also an invention of the present application provides an image display apparatus including:

an image display unit including an internal space; and a support member for supporting the image display unit;

wherein, in a plane defined by an outer periphery of the image display unit and a plane defined by an outer periphery of the support member, a projection from either one to the other is substantially rectangular; an adhering member is provided in a part of such substantially rectangular area and combines the image display unit and the support member; an area substantially without the adhering member is present from a central portion of one of mutually opposed two sides of the substantially rectangular area to a central portion of the other side; and such area substantially without the adhering member extends from the aforementioned one side over a distance at least equal to ⅔ of a distance between the two sides.

It is preferred that the area substantially without the adhering member has a width of 5 cm or larger.

In the following, the present invention will be clarified in more details by embodiments thereof, with reference to the accompanying drawings.

(First Embodiment)

Figure 2:
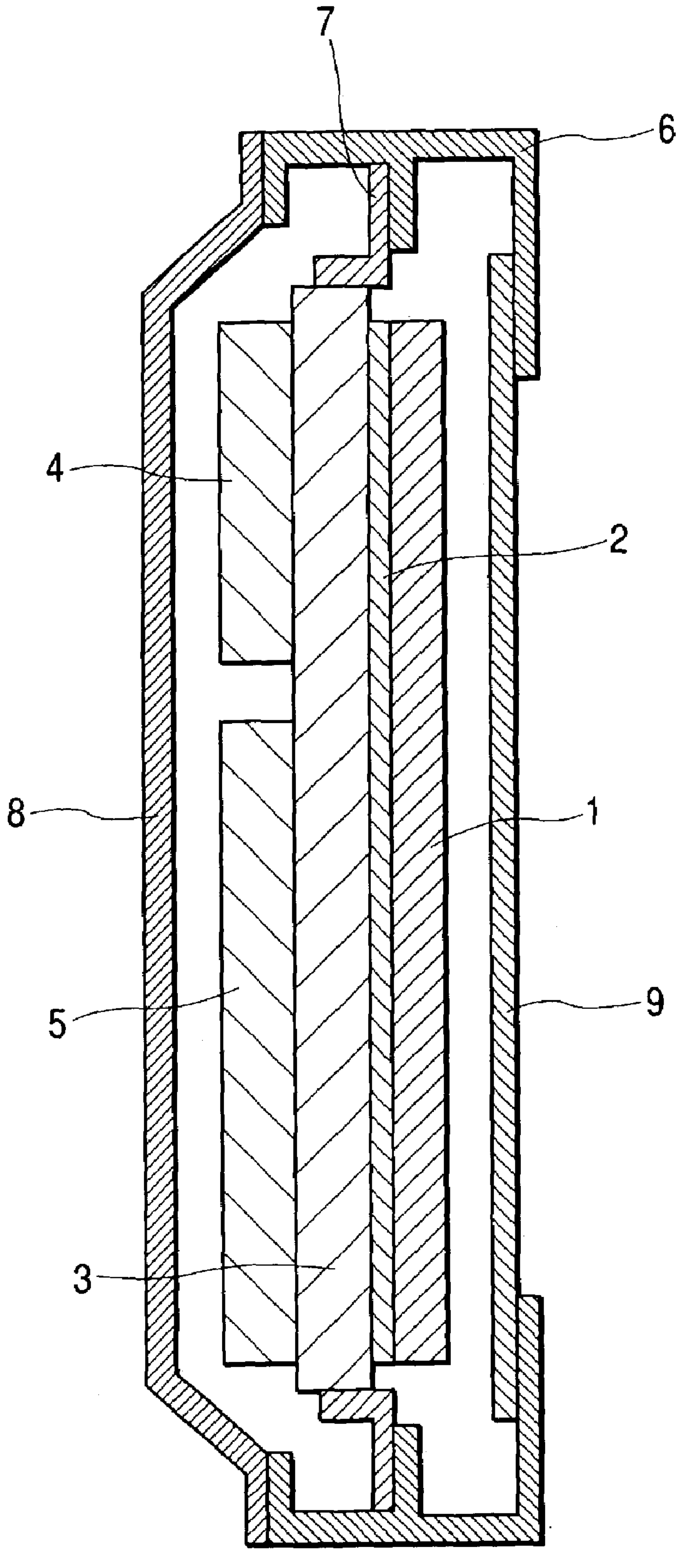
FIG. 2 is a cross-sectional view of a television set employing the image display apparatus shown in FIG. 1.

FIG. 1 is a perspective view showing an image display apparatus and a disassembling apparatus for disassembling the image display apparatus, constituting a first embodiment of the present invention, and FIG. 2 is a cross-sectional view of a television set employing the image display apparatus shown in FIG. 1. Referring to FIGS. 1 and 2, numerals 1 to 9 indicate configurations of the television set, and numerals 10 to 16, 1001 to 1003 indicate configurations of the disassembling apparatus.

At first there will be explained, with reference to FIG. 2, a configuration of the television set including the image display apparatus of the present embodiment.

The image display apparatus of the present embodiment is provided with an image display unit 1 of a rectangular shape, in which two glass substrates bearing electrical wirings are mutually adhered to constitute a vacuum container, and a support member 3 constituted by die casting of an aluminum alloy into a predetermined shape and positioned to be opposed to the rear side of the image display unit 1. A glass substrate of the rear side of the image display unit 1 and the support member 3 are mutually adjoined by an adhesive member 2, formed by coating an acrylic sticking material on both surfaces of a base member of a polyolefinic foamed material into a thickness of about 1 mm. In the present embodiment, as the sticking member constituting the adhesive member for adjoining the display unit and the support member, there is employed a sticking material which is not completely hardened, not only at the assembling but also thereafter, but maintains viscous property over a long period, thereby relaxing the influence of a stress resulting between the display unit and the support member. However, such configuration is not restrictive, and the adhering member constituting the image display apparatus may be formed by a sticking material which shows viscosity when required at the assembling but is hardened after the assembling. On a surface of the support member 3, opposite to the surface thereof supporting the image display unit 1, there are provided a drive circuit 4 for generating an electrical signal for causing an image display on the image display unit 1, and an electrical circuit 5 for controlling the drive circuit 4 and for an electric power supply to various units of the television sets. Also the support member 3 is provided with unrepresented ribs and bosses for increasing the rigidity of the support member 3 itself and protecting the image display unit 1 from an impact from the exterior and from a mechanical load.

The image display apparatus thus configured is accommodated in a space formed by a front cover 6 constructed by pressing an aluminum alloy into a predetermined shape, and a rear cover 8 constructed by pressing an aluminum alloy into a predetermined shape. The covers 6, 8 protect the internally accommodated image display apparatus and other electrical components from a mechanical load, moisture or dusts, and serve to form an external design of the television set.

The support member 3 is supported in the interior of the covers 6, 8, by plural front cover mounting portions 7 provided on the periphery of the support member 3. Such front cover mounting portions 7 combine the support member 3 and the front cover 6 by unrepresented screws.

The front cover 6 is provided, in a part thereof opposed to the image display unit 1, with an aperture for displaying image, and, in such aperture, there is provided a transparent face plate 9. The face plate 9 has a function of protecting the image display apparatus and other electrical components in the covers 6, 8 from a mechanical load, moisture and dusts, and is provided with a functional film (not shown) for improving the quality, particularly contrast, of the image displayed by the image display apparatus.

In the following there will be explained, with reference to FIG. 1, a configuration of a disassembling apparatus of the present embodiment for disassembling the image display apparatus.

The disassembling apparatus shown in FIG. 1 includes a receiving base 10 to be used in disassembling an image display apparatus composed of the image display unit 1 and the support member 3 which are adjoined by the adhesive member 2, and a control unit 11 for controlling a step of cutting the adhesive member 2 of the image display apparatus and controlling a step of separating the image display unit 1 and the support member 3. The disassembling apparatus has a structure of holding the support member 3 of the image display apparatus. More specifically, it is provided with fingers 1001 for holding end portions of the support member 3 in four position, as a structure for holding the support member 3 in a state in close contact with the receiving base 10. A cutting operation is executed in a state where the support member 3 is fixed by such fingers 1001. These fingers 1001 are inserted, after the display apparatus to be disassembled is placed in a predetermined position on the receiving base 10, into the receiving base 10 and the control unit 11 in such a manner that the support member 3 is clamped by the fingers 1001. In particular, the upper two fingers 1001 are inserted after a cutting unit 12 is positioned on an upper part of the adhesive member 2.

At a side of the control unit 11, there is provided a cutting arm 14, having a cutting unit 12 of a shape of a wire (a linear shape) constituted by an electroconductive iron-containing metal with a diameter of about 0.3 mm, movably in the vertical direction along a guide unit 16, which is provided in a vertically extended state on the control unit 11. In the control unit 11, there are provided a motor (not shown) for driving the cutting arm 14 and a heat control circuit (not shown) for controlling a current for generating heat in the cutting unit 12. The cutting arm 14 is provided with a support portion for supporting the cutting unit 12, a wiring portion (not shown) for guiding the current for heat generation in the cutting unit 12, and a support portion (not shown) positioned inside the guide unit 16 of the control unit 11. Thus the cutting arm 14 moves by the motor up and down along the guide unit 16, and the cutting unit 12 generates heat by the current supplied under the control of the heat control circuit.

On an upper surface of the control unit 11, there is provided a separating arm 15 having a separating unit 13 for separating the image display unit 1 and the support member 3 of the image display apparatus. The separating arm 15 includes a fixing portion for fixing the separating unit 13 and a support portion (not shown) positioned inside the control unit 11, and is rendered vertically movable by unrepresented drive means. The separating unit 13 is composed of a heat-resistant resin formed in a wedge shape in a front end, and is so constructed as to be inserted into a gap between the image display unit 1 and the support member 3 when the separating arm 15 is positioned lower than a certain height.

Figure 3:
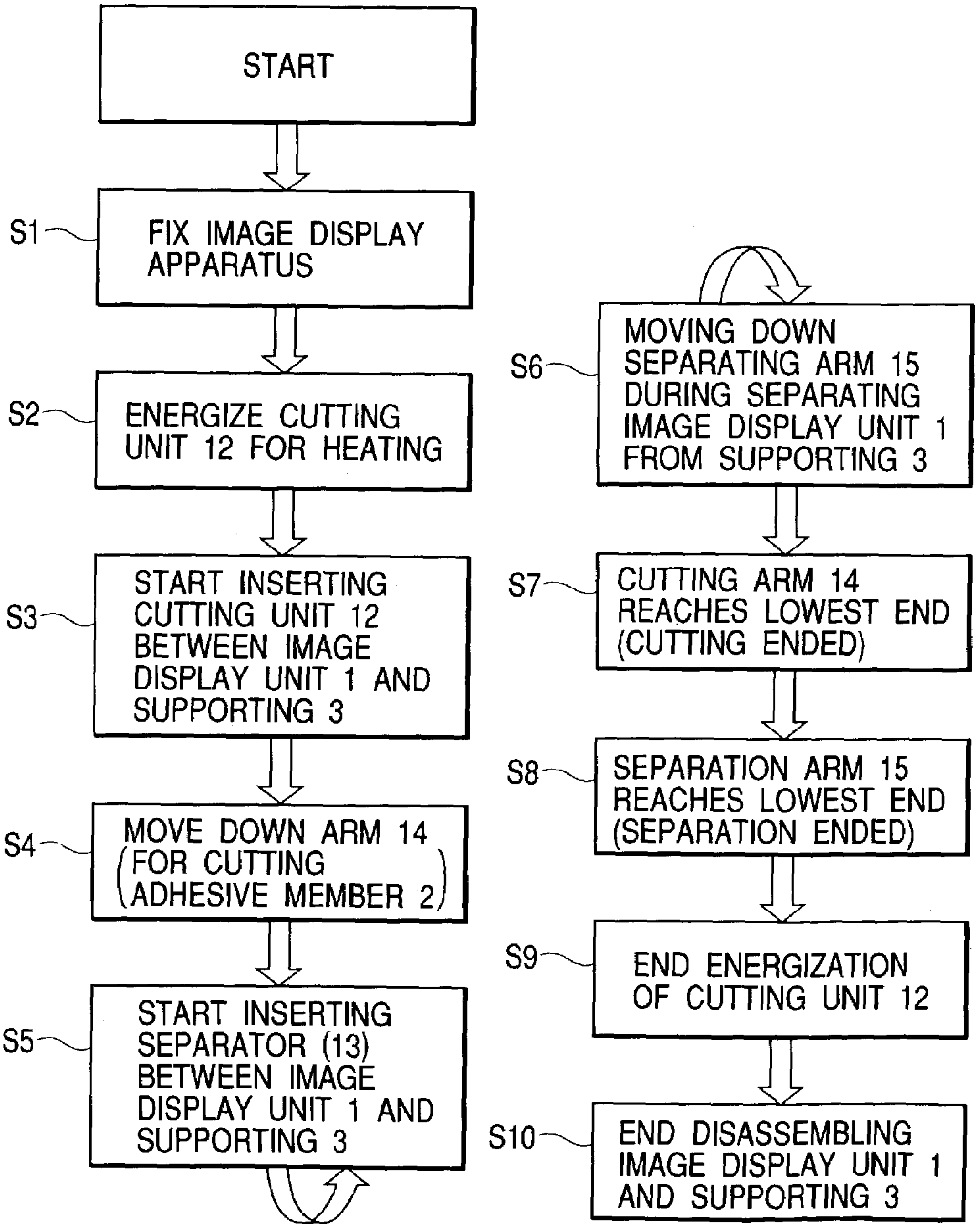
FIG. 3 is a flow chart showing a disassembling operation for the image display apparatus, by the disassembling apparatus shown in FIG. 1.

In the following there will be explained, with reference to FIGS. 1 to 3, a disassembling operation for the image display apparatus by the disassembling apparatus constructed as explained in the foregoing. FIG. 3 is a flow chart showing a disassembling operation for the image display apparatus, by the disassembling apparatus shown in FIG. 1.

In disassembling an image display apparatus, the image display apparatus separated from covers and electrical circuits of a television set is vertically placed on the receiving base 10 in such a manner that a shorter side of the image display unit 1 is in the vertical direction, and the support member 3 is supported on the receiving base 10 by the fingers 1001 constituting fixing means (Step 1).

Then the control unit 11 is operated to energize the cutting unit 12, thereby causing heat generation and heating the cutting unit 12 to about 200° C. (Step 2).

Then the cutting unit 12 is inserted in the gap between the image display unit 1 and the support member 3, in a position along the shorter side of the sticking member 2 (Step 3), and the control unit 11 is operated to lower the cutting arm 11 (Step 4). Tn this state, the cutting unit 12 has a moving direction parallel to a longer side of the image display unit 1 of a rectangular shape. When the cutting unit 12 impinges on the adhesive member 2, the sticking layer formed by the acrylic material and the base material formed by the polyolefinic material in the adhesive member 2 are softened by heat conduction from the heated cutting unit 12, whereby the adhesive member 2 is cut by a mechanical shearing force generated by the descent of the cutting unit 12. The adhesive member 2 is gradually cut from an upper end portion, with a slow descending motion. The present embodiment adopts a configuration of cutting the adhesive member 2 which constitutes the adhering member, and, for such cutting of the adhering member, there can be employed, as an example, a case of cutting the adhering member in an intermediate position (not limited to a center position) thereof. In such case, a part of the cut adhesive member 2 remains on both the support member 3 and the image display unit 1 after the cutting. The cutting of the adhering member may also be achieved by cutting a position where the adhesive member 2 and the support member 3 is adhered, namely by peeling the adhesive member 2 and the support member 3. It is also possible to cut a position where the adhesive member 2 and the image display unit 1 are adhered, namely to peel the adhesive member 2 and the image display unit 1. By moving the cutting unit 12 in contact with the support member 3 or the image display unit 1, the cutting of the adhering member may be achieved at a position between the adhesive member 2 and the support member 3 or at a position between the adhesive member 2 and the image display unit 1. In such case it is possible to cause the adhesive member not to remain on either of the support member 3 and the image display unit 1 after the cutting.

Then, when the cutting of the adhesive member 2 proceeds to about ¼ of the length of the longer side of the image display unit 1, while the cutting operation of the adhesive member 2 is still maintained, the control unit 11 is operated to insert the separating unit 13 in the gap between the image display unit 1 and the support member 3 (Step 5), and to lower the separating arm 15 (Step 6). In this operation, the inserting direction of the separating unit 13 coincides with the inserting direction of the cutting unit 12. The separating unit 13 has a sharp wedge shape at the lower end, and a force applied to the image display unit 1 and the support member 3 at the descent of the separating unit 13 works as a force for separating the image display unit 1 from the support member 3. Stated differently, with the descent of the separating arm 15, the image display unit 1 becomes gradually distanced from the support member 3. Along with this operation, a force is applied to the adhesive member 2 in a direction for splitting the adhesive member 2, whereby the cutting of the adhesive member 2 by the cutting unit 12 can be accelerated. It is preferable to support the image display unit 1 in order to prevent the display unit 1 from tumbling after being separated from the support member 3.

Thereafter, the descending operation of the cutting arm 14 is terminated when the cutting arm 14 reaches a lowest end of a movable stroke and the cutting unit 12 cuts all the adhesive member 2 (Step 7). Immediately thereafter, the separating arm 15 also reaches a lowest end of a movable stroke thereby terminating the descending operation (Step 8). Then the control unit 11 terminates the current supply to the cutting unit 12 (Step 9).

Through the foregoing operations, the image display unit 1 is completely separated (disassembled) from the support member 3 (Step 10).

The separated image display unit 1, for safe handling at the removal from the receiving base 10, is desirably held by suction, with a commercially available suction cup 1002 pressed to the image display unit 1. By canceling the suction-power of the suction cup 1002 which is holding the image display unit 1 after separation it becomes possible to remove the image display unit from the receiving base 10. Also the support member 3 is detached from the receiving base 10 after the image display unit 1 is removed from the receiving base 10, the separating arm 15 and the cutting arm 14 are elevated to highest positions of the respective moving strokes by an operation of the control unit 11, and the fingers 1001 are moved in the direction which cancels fixing the image display unit 1.

In the present embodiment, at the disassembling of the image display apparatus, as explained in the foregoing, the cutting unit 12 is inserted between the image display unit 1 and the support member 3 to cut the adhesive member 2, whereby the image display unit 1 and the support member 3 can be mutually separated without being subjected to a load. Therefore, the image display unit 1 and the support member 3 can be safely separated without breakage, and it is furthermore rendered possible to recycle thus separated image display unit 1 and support member 3.

In the foregoing, there has been explained an example of inserting the separating unit 13 between the image display unit 1 and the support member 3 for separating the two, but it is also possible to separate the image display unit 1 and the support member 3 by employing, instead of the separating unit 13, a suction cup 1002 capable of attaching by suction to either of the image display unit 1 and the support member 3, and fixing means for fixing the other one, to which the suction cup 1002 is not attached, of the image display unit 1 and the support member 3, and pulling either one of the image display unit 1 and the support member 3 in a direction separating from the other. In such case, the suction cup 1002 is preferably pulled in a direction substantially perpendicular to the surface of the image display unit 1 or the support member 3. FIG. 1 shows a drive unit 1003 for pulling the suction cup 1002 in a direction perpendicular to the surface of the display unit 1.

Also in the foregoing, there has been explained a case where the image display apparatus is positioned vertically, but the image display apparatus may also be positioned horizontally together with the disassembling apparatus. In case the image display apparatus is positioned horizontally, the image display unit 1 may be positioned above or below the support member 3.

(Second Embodiment)

Figure 4:
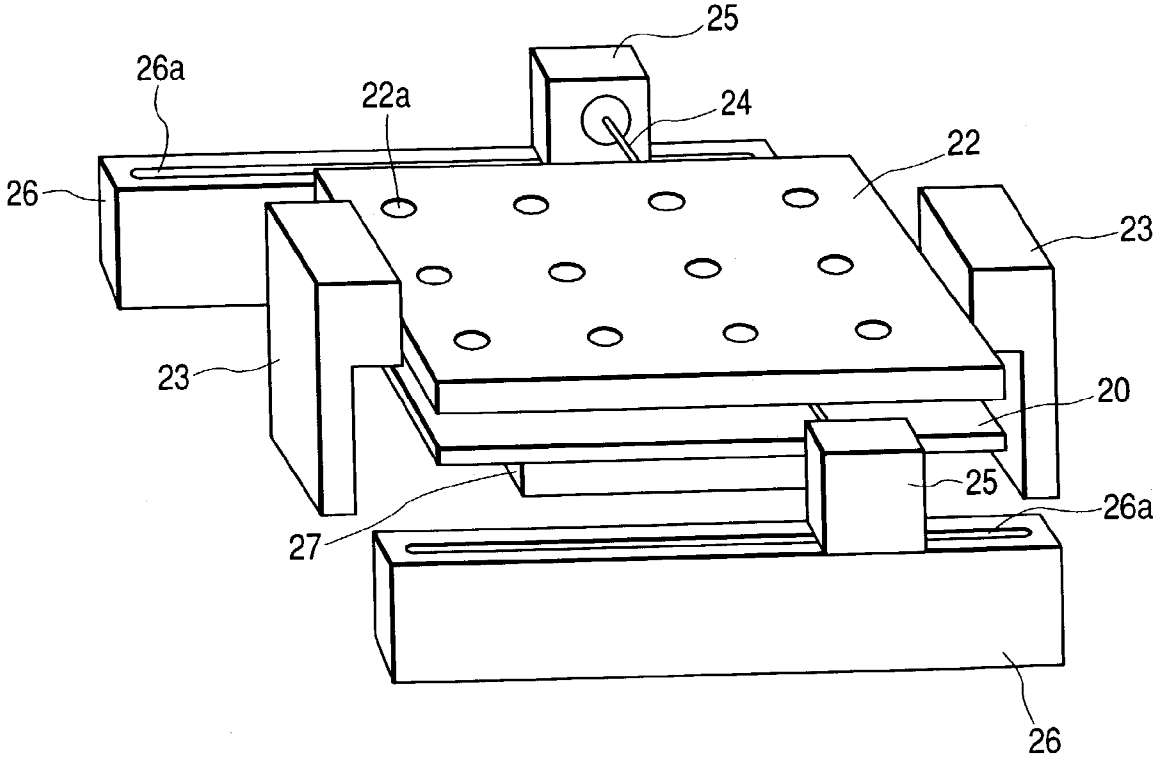
FIG. 4 is a perspective view showing an image display apparatus constituting a second embodiment of the present invention, and a disassembling apparatus for disassembling the image display apparatus.
Figure 5:
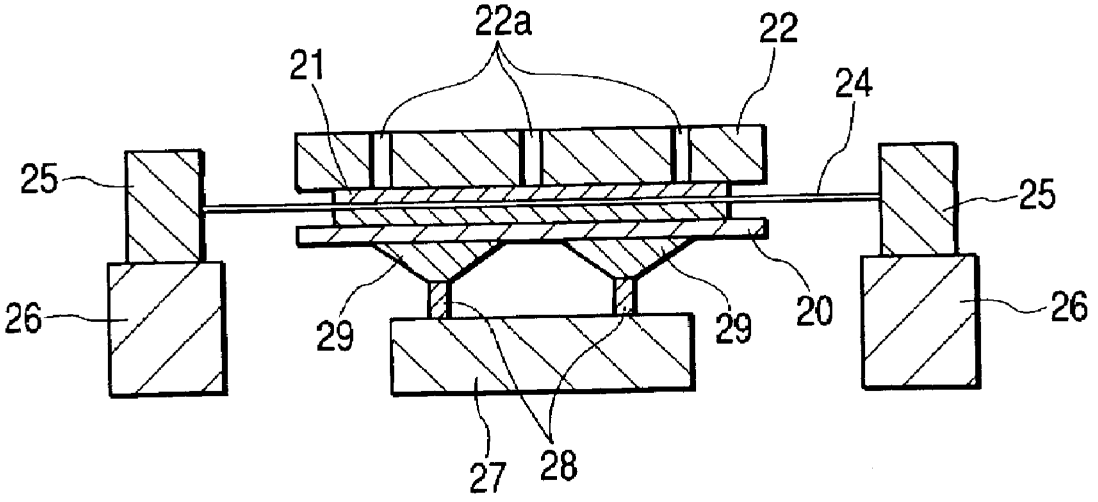
FIG. 5 is a cross-sectional view of the image display apparatus and the disassembling apparatus shown in FIG. 4, in a direction along a shorter side of the image display apparatus.
Figure 6:
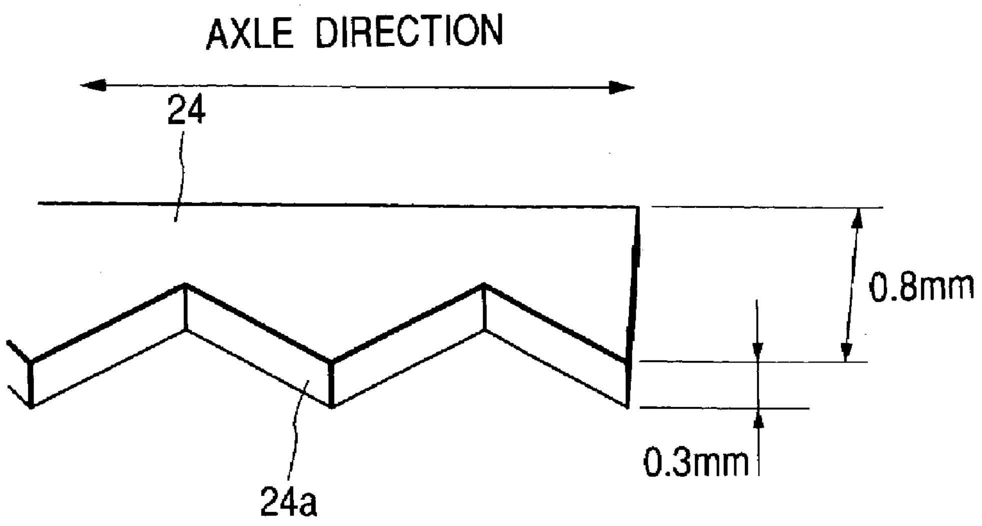
FIG. 6 is a partial magnified perspective view of a cut portion in FIG. 4 etc.

FIG. 4 is a perspective view showing an image display apparatus and a disassembling apparatus for disassembling the image display apparatus, constituting a second embodiment of the present invention, FIG. 5 is a cross-sectional view of the image display apparatus and the disassembling apparatus shown in FIG. 4 along a direction of a shorter side of the image display apparatus, and FIG. 6 is a partially magnified perspective view of a cut portion shown in FIG. 4 etc. Referring to FIGS. 4 to 6, numerals 20 to 22 indicate configurations of the image display apparatus, and numerals 23 to 29 indicate configurations of the disassembling apparatus.

At first there will be explained, with reference to FIG. 4, a configuration of the image display apparatus of the present embodiment.

The image display apparatus of the present embodiment is provided with an image display unit 20, in which two glass substrates bearing electrical wirings are mutually adhered to constitute a vacuum container, and a support member 22 constituted by die casting of an aluminum alloy into a predetermined shape and positioned to be opposed to the rear side of the image display unit 20. A glass substrate of the rear side of the image display unit 20 and the support member 22 are mutually adjoined by an adhesive member 21, formed by coating an acrylic sticking material on both surfaces of a base member of a polyolefinic foamed material into a thickness of about 1 mm.

The support member 22 is provided with unrepresented ribs and bosses for increasing the rigidity of the support member 22 itself and protecting the image display unit 20 from an impact from the exterior and from a mechanical load. In the support member 22, there are formed plural penetrating holes 22*a* of a diameter of about 10 mm, penetrating from a rear surface on which the adhesive member 21 is adjoined to a front surface opposite thereto. These penetrating holes 22*a* are formed integrally at the die casting formation of the support member 22.

The configuration of a television set, incorporating the image display apparatus of the above-described configuration, is similar to that in the first embodiment, so that the configuration of the television set will not be explained further.

In the following there will be explained, with reference to FIGS. 4 to 6, a configuration of the disassembling apparatus of the present embodiment for disassembling the image display apparatus.

The disassembling apparatus of the present embodiment includes two receiving bases 23 to be used in disassembling an image display apparatus composed of the image display unit 20 and the support member 22 which are adjoined by the adhesive member 21, and having a structure for holding the support member 22 of the image display apparatus in a closely contacted state, horizontal drive units 26 provided in the vicinity of both longer sides of the image display apparatus for moving, horizontally along the longer side of the image display apparatus, cutting arms 25 holding a cutting unit 24 composed of a plate-shaped elongated member constituted by an iron-containing metal with a width of 0.8 mm and a thickness of 0.3 mm, and a vertical drive unit 27 for vertically moving, via a separating arm 28, a separating unit 29 for contacting and holding the image display unit 20.

A surface of the cutting unit 24 coming into contact with the adhesive member 21 is provided, as shown in FIG. 6, with a sawtooth cutting blade 24*a* over the entire longitudinal length of the cutting unit 24. The cutting arms 25 are respectively fixed to the ends of the cutting unit 24, and at least one of the cutting arms 25 incorporates a drive unit (not shown) for causing a reciprocating motion of the cutting unit 24 in the longitudinal direction (lengthwise direction). The horizontal drive units 26 for horizontally moving the cutting arms 25 along the longer sides of the image display apparatus are respectively provided with guide units 26*a* which extend horizontally along the longer sides of the image display apparatus and which serve as guides for horizontally moving the cutting arms 25.

The vertical drive unit 27 is positioned directly below the image display unit 20 of the image display apparatus, and is provided therein with a drive mechanism for vertically moving the separating arm 28, and a vacuum mechanism for sucking or discharging air. The separating arm 28 is provided therein with a penetrating hole for passing the air sucked or discharged by the vacuum mechanism, and is combined with the drive mechanism and the vacuum mechanism in the vertical drive unit 27. The separating unit 29 is provided with a suction cup made of silicone rubber and a connecting portion to the separating arm 28, and is mounted on an end portion of the separating arm 28. The separating unit 29 is provided, from an end of the connecting portions at the side of the separating arm 28 to the a suction surface of the suction cup, with an air flow hole communicating with the penetrating hole in the separating arm 28. Thus, owing to the above-described configuration, by elevating the separating arm 28 by the drive mechanism of the vertical drive unit 27 to bring the separating unit 29 in contact with the image display unit 20 and by activating the vacuum mechanism of the vertical drive unit 27 to suck the air, the image display unit 20 can be supported by the separating unit 29.

Also as in the disassembling apparatus of the first embodiment, the disassembling apparatus of the present embodiment has a control unit for controlling the drive mechanism in the horizontal drive units 26, the drive mechanism and the vacuum mechanism in the vertical drive unit 27.

Figure 7:
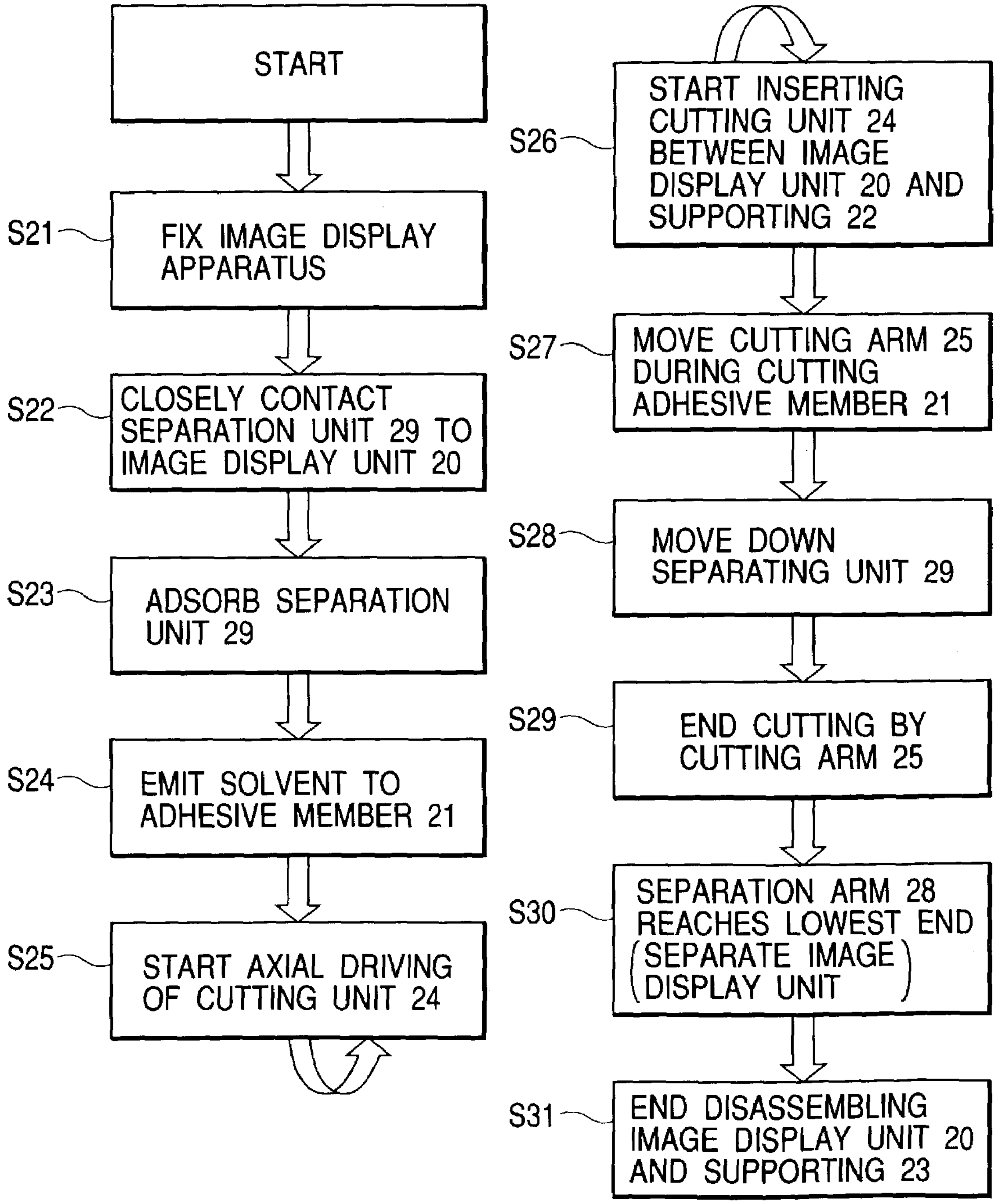
FIG. 7 is a flow chart showing a disassembling operation for the image display apparatus, by the disassembling apparatus shown in FIG. 4 etc.

In the following there will be explained, with reference to FIGS. 4 to 7, a disassembling operation for the image display apparatus by the disassembling apparatus constructed as explained in the foregoing. FIG. 7 is a flow chart showing a disassembling operation for the image display apparatus, by the disassembling apparatus shown in FIG. 4 etc.

In disassembling an image display apparatus, the image display apparatus separated from covers and electrical circuits of a television set is horizontally placed in such a manner that shorter sides of the image display unit 20 are respectively opposed to the two receiving bases 23, and the support member 22 is fixed to the receiving base 23 by fixing means (Step 21).

Then the drive mechanism of the vertical drive unit 27 is activated to elevate the separating arm 28, and the function of the drive mechanism of the vertical drive unit 27 is terminated when the separating unit 29 comes into close contact with the image display unit 20 (Step 22). Then the vacuum mechanism of the vertical drive unit 27 is activated to suck the air, thereby attaching the separating unit 28 by suction to the image display unit 20 (Step 23).

Then, acetone, which is a hydrocarbon solvent for softening the adhesive member 21, is dripped into the penetrating holes 22*a* of the support member 22 and is made to penetrate into the adhesive member 21, thereby softening the adhesive member 21 (Step 24). Then, after a lapse of about 5 minutes, required for softening the adhesive member 21, the drive mechanism in the cutting arm 25 is activated to initiate the longitudinal reciprocating motion of the cutting unit 24 (Step 25). The reciprocating motion is executed with a speed of 200 to 300 cycles per minute.

Then the drive mechanisms of the horizontal drive units 26 are activated to align the cutting unit 24 in a position at a gap between the image display unit 20 and the support member 22 and along a shorter side portion of the adhesive member 21, and the cutting arms 25 are horizontally moved to insert the cutting unit 24 into the above-mentioned gap (Step 26). In this operation, the cutting arms 25, while cutting the adhesive member 21 softened by the solvent with the longitudinal reciprocating motion of the cutting unit 24, moves further in the horizontal direction (Step 27) It is desirable, even during such movement, to suitably drop the solvent through the penetrating holes 22*a* of the support member 22.

When the cutting of the adhesive member 21 proceeds to about ¼ of a length of a longer side of the image display unit 20, the drive mechanism of the vertical drive unit 27 is activated to move the separating arm 28 slightly downwards, while maintaining the cutting operation of the adhesive member 21 (Step 28) In this manner the separating unit 29 in contact with the image display unit 20 exerts a force for separating the image display unit 20 from the support member 22, whereby an empty gap is generated between the image display unit 20 and the support member 22 within a range where the adhesive member 21 is already cut. As the cutting operation of the adhesive member 21 further proceeds, the range of the empty gap between the image display unit 20 and the support member 22 is gradually spread.

When the cutting arms 25 reach a final end of the horizontal movement and the cutting unit 24 completely cuts the adhesive member 21, the drive mechanism in the cutting arms 25 is deactivated to terminate the longitudinal movement of the cutting unit 24 and the drive mechanisms in the horizontal drive units 26 are deactivated to terminate the movement of the cutting arms 25 (Step 29). Then the drive mechanism in the vertical drive unit 27 is activated again to lower the separating arm 28 to a lowest end position where the movement is stopped (Step 30).

Through the above-described operations, the image display unit 20 is completely separated from the support member 22 (Step 31).

Thereafter the support member 22 is detached from the receiving base 23, then the cutting arms 25 are returned to the initial positions by the horizontal drive units 26, and the vacuum mechanism in the vertical drive unit 27 is switched from a vacuum state to an open state whereby the image display unit 20 is detached from the separating unit 29.

In the present embodiment, at the disassembling of the image display apparatus, as explained in the foregoing, the cutting unit 24 is inserted between the image display unit 20 and the support member 22 to cut the adhesive member 21, whereby the image display unit 20 and the support member 22 can be mutually separated without being subjected to a load. Therefore, the image display unit 20 and the support member 22 can be safely separated without breakage, and it is furthermore rendered possible to recycle thus separated image display unit 20 and support member 22.

Further, in the present embodiment, it is made possible to promptly cut the adhesive member 21 through the cutting of the adhesive member 21 with the reciprocating motion of the cutting unit 24 having the sawtooth blade 24*a*. Also the adhesive member 21 is softened and made easily cuttable by the addition of the solvent capable of softening the adhesive member whereby the adhesive member 21 can be cut more promptly.

In the foregoing there has been explained an example of cutting the adhesive member 21 by the reciprocating motion of the plate-shaped cutting unit 24, but means of cutting the adhesive member 21 is not limited to such example and a similar effect can be obtained also in a configuration of rotating a cutting unit, constituted by an elongated member having a cutting blade on the external periphery and over the almost entire longitudinal length, about the longitudinal axis. More specifically, the cutting arms 25 shown in FIG. 4 may be so constructed as to rotate a cutting unit constituted by an elongated member.

Also in the foregoing, there has been explained a case where the image display apparatus is horizontally positioned, but it is also possible to position the image display apparatus vertically together with the cutting unit, and to move the separating unit in the horizontal direction.

(Third Embodiment)

Figure 8:
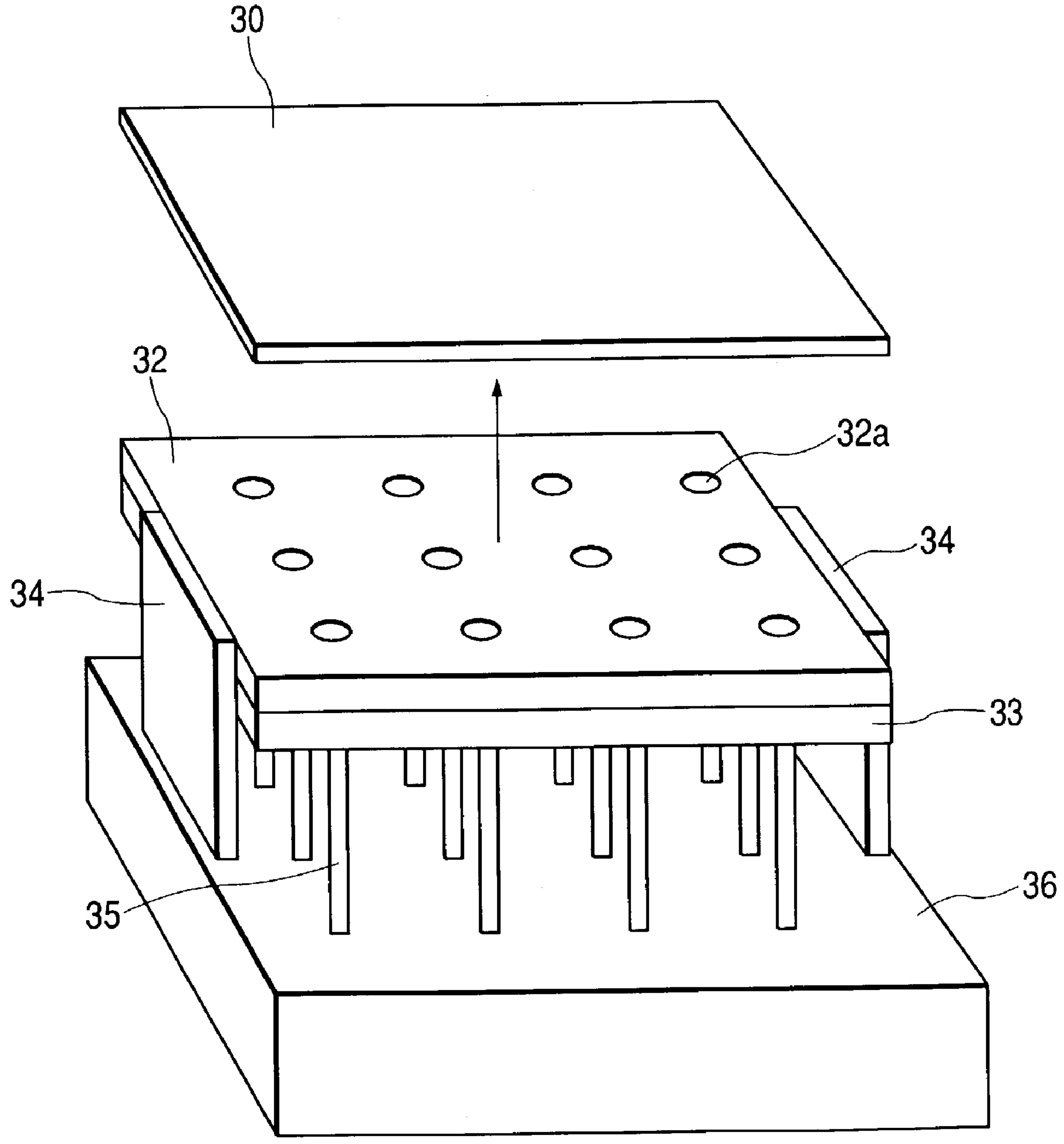
FIG. 8 is a perspective view showing an image display apparatus constituting a third embodiment of the present invention, and a disassembling apparatus for disassembling the image display apparatus.
Figure 9:
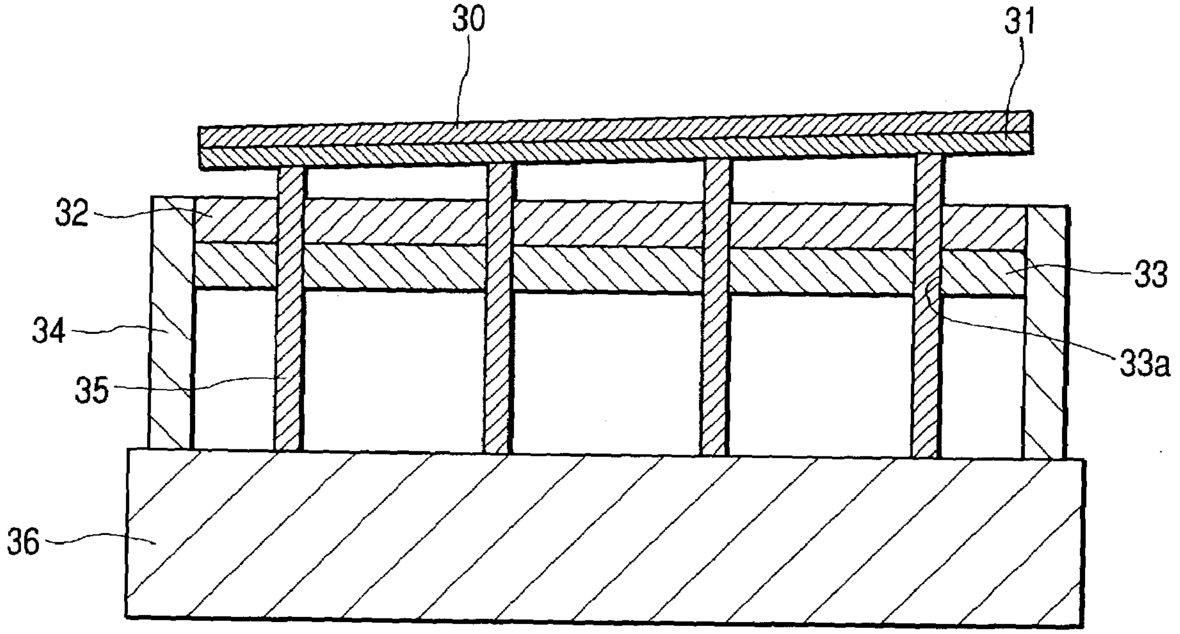
FIG. 9 is a cross-sectional view of the image display apparatus and the disassembling apparatus shown in FIG. 8, in a direction along a longer side of the image display apparatus.

FIG. 8 is a perspective view showing an image display apparatus and a disassembling apparatus for disassembling the image display apparatus, constituting a third embodiment of the invention of the present application, and FIG. 9 is a cross-sectional view of the image display apparatus and the disassembling apparatus shown in FIG. 8 along a direction of a longer side of the image display apparatus. In FIG. 8, the image display apparatus is illustrated in a state where an image display unit is separated upwards, in order to facilitate the understanding of the structure of the image display apparatus. FIG. 9 is illustrated in a stale where an image display apparatus is disassembled. Referring to FIGS. 8 and 9, numerals 30 to 32 indicate configurations of the image display apparatus, and numerals 33 to 36 indicate configurations of the disassembling apparatus.

At first there will be explained, with reference to FIGS. 8 and 9, a configuration of the image display apparatus of the present embodiment.

The image display apparatus of the present embodiment is provided with an image display unit 30 of a rectangular shape, in which two glass substrates bearing electrical wirings are mutually adhered to constitute a vacuum container, and a support member 32 constituted by die casting of an aluminum alloy into a predetermined shape and positioned to be opposed to the rear side of the image display unit 30. A glass substrate of the rear side of the image display unit 30 and the support member 32 are mutually adjoined by an adhesive member 31, formed by coating an acrylic sticking material on both surfaces of a base member of a polyolefinic foamed material into a thickness of about 1 mm.

The support member 32 is provided with unrepresented ribs and bosses for increasing the rigidity of the support member 32 itself and protecting the image display unit 30 from an impact from the exterior and from a mechanical load. In the support member 32, there are formed plural penetrating holes 32*a* of a diameter of about 10 mm, penetrating from a rear surface on which the adhesive member 31 is adjoined to a front surface opposite thereto. These penetrating holes 32*a* are formed integrally at the die casting formation of the support member 32.

The configuration of a television set, incorporating the image display apparatus of the above-described configuration, is similar to that in the first embodiment, so that the configuration of the television set will not be explained further.

In the following there will be explained, with reference to FIGS. 8 and 9, a configuration of the disassembling apparatus of the present embodiment for disassembling the image display apparatus.

The disassembling apparatus of the present embodiment includes a receiving base 33 to be used in disassembling an image display apparatus composed of the image display unit 30 and the support member 32 which are adjoined by the adhesive member 31, an attach/detaching mechanism 34 for holding the receiving base 33 and fixing the support member 32 of the image display apparatus on both lateral sides, and plural separating units 35 moved up and down by a control unit 36.

The receiving base 33 is formed by a heat-conductive member so constructed as to be in contact with the support member 32 and to support the support member 32 from a lower side, and incorporates a heater (not shown) constituting heating means. The receiving base 33 is entirely heated by the heat of the incorporated heater and constitutes heating means for heating the adhesive member 31 constituting the adhering member. The receiving base 33 is further provided with penetrating holes 33*a* of a dimension approximately similar to that of the penetrating holes 32*a*, in positions opposed to the penetrating holes 32*a* of the support member 32 held thereon.

The attach/detaching mechanism 34, constituting fixing means, is provided with a structure (not shown) for switching a fixation or a release of the support member 32, and incorporates electric power supply wirings for supplying the heater in the receiving base 33 with an electric power for heating.

The separating units 35, constituted as movable members, have a substantially circular cross section and are so positioned as to pass through the penetrating holes 32*a*, 33*a* of the support member 32 and the receiving base 33. As shown in FIG. 9, these separating units 35 are so configured that the one at the right-hand side in the illustration, close to a shorter side of the image display unit 30 of rectangular shape, is highest and the height is progressively decreased toward the left-hand side of the illustration, closer to the other shorter side.

The control unit 36 is provided below the image display apparatus to be disassembled, and is provided therein with a power supply (not shown) for supplying an electric power for heating the heater in the receiving base 33, a temperature control circuit (not shown) for temperature control of the heater of the receiving base 33, and a motor mechanism for vertically moving the separating units 35 and a control mechanism (not shown) thereof. On an upper surface of the control unit 36, there are provided a fixing unit for fixing the attach/detaching mechanism 34 and a holding unit for slidably holding the separating unit 35 (both being not shown). Operation knobs for operating the control unit 36 and a power supply cable therefor are omitted from the illustration and the description.

Figure 10:
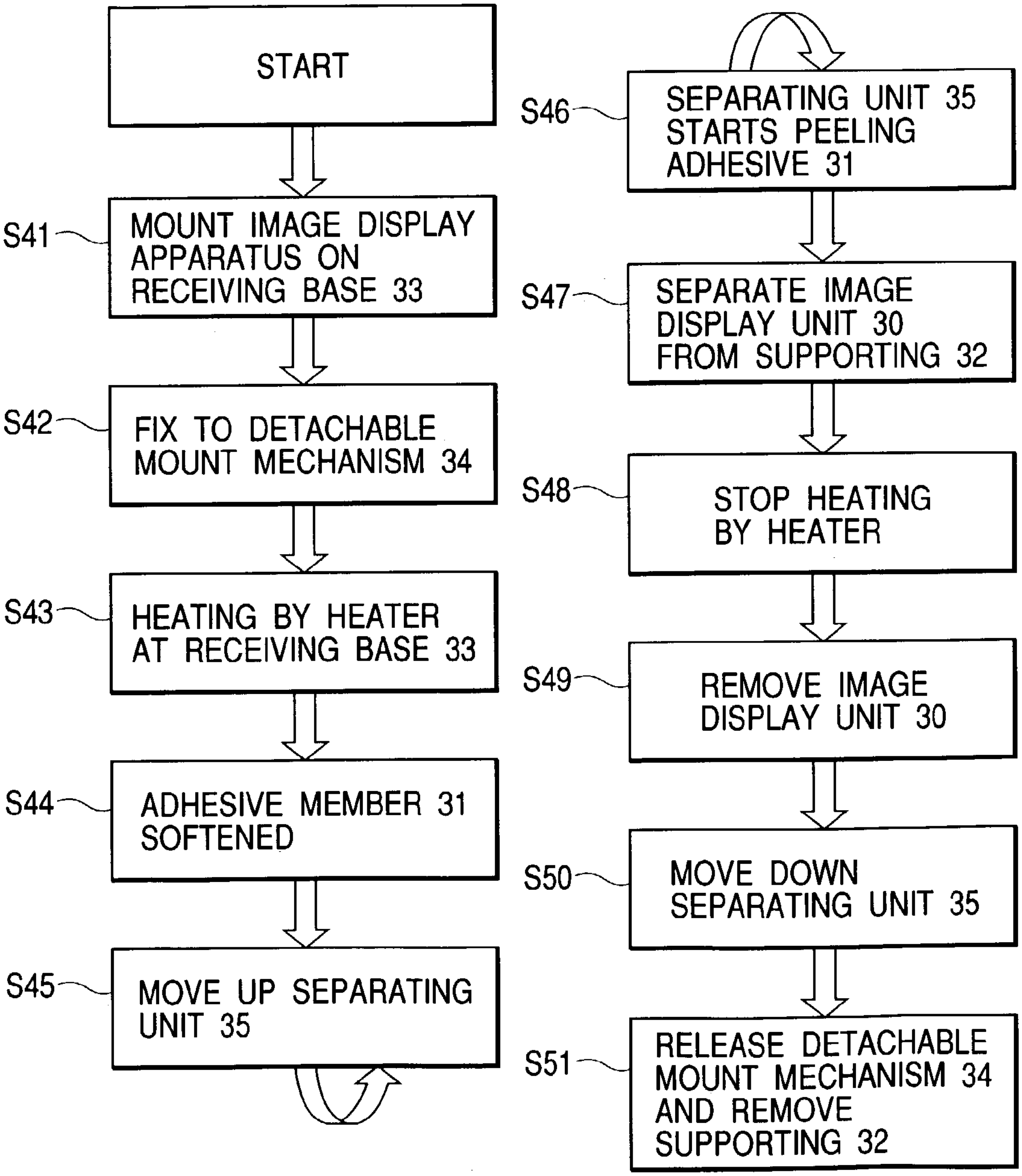
FIG. 10 is a flow chart showing a disassembling operation for the image display apparatus, by the disassembling apparatus shown in FIG. 8 etc.

In the following there will be explained, with reference to FIGS. 8 to 10, a disassembling operation for the image display apparatus by the disassembling apparatus constructed as explained in the foregoing. FIG. 10 is a flow chart showing a disassembling operation for the image display apparatus, by the disassembling apparatus shown in FIG. 8 etc.

In disassembling an image display apparatus, the image display apparatus separated from covers and electrical circuits of a television set is horizontally placed on the receiving base 33, with the image display unit 30 upward and the support member 32 downward (Step 41), and the support member 32 is fixed by the attach/detaching mechanism 34 (Step 42).

Then, under the control of the control unit 36, the heater in the receiving base 33 is energized to start the heating thereof (Step 43). The heat from the heater is transmitted to a heat-conductive member in the receiving base 33, and then to the support member 32 of the image display apparatus, maintained in contact with the upper surface of the receiving base 33. The support member 32, composed of an aluminum alloy, efficiently transmits such heat to the adhesive member 31 in contact with the upper surface of the support member 32. Thus, with a gradual increase in the temperature, the adhesive member 31 of a resinous material is softened and progressively loses the sticking power, whereby the adhering force between the support member 32 and the image display unit 30 is weakened (Step 44).

At this point, the motor mechanism and the control mechanism in the control unit 36 are activated to elevate the separating units 35 (Step 45). In the course of the elevating movement, the separating units 35 pass through the penetrating holes 33*a* of the receiving base 33, then the penetrating holes 32*a* of the support member 32 and reach the lower surface of the adhesive member 31. The separating units 35 are further lifted to lift up the adhesive member 31 and the image display unit 30 in close contact thereon, thereby peeling off the adhesive member 31 from the support member 32 (Step 46), whereby the image display unit 30 can be separated from the support member 32 (Step 47).

Since the glass plates of the image display unit 30 may be broken if a large load is applied thereto in this operation, the separation of the image display unit 30 from the support member 32 has to be executed under a limited load. In this connection, as the separating units 35 are not of a uniform height but are made gradually lower from the right to the left in FIG. 9 as explained in the foregoing, the separating operation of the adhesive member 31 and the image display unit 30 from the support member 32 is started from the right side as shown in FIG. 9.

More specifically, at the insertion of the plural separating unit 35 into the penetrating holes 32*a* of the support member 32 to press the adhesive member 31, the action point of the pressure working on the adhesive member 31 and the image display unit 30 shifts in succession from a vicinity of a shorter side of the image display unit 30, at the right side in the illustration, toward a vicinity of the other shorter side at the left side in the illustration. With such shift of the action point, the adhesive member 31 is peeled off in progressive manner from the support member 32.

Therefore, such configuration allows to efficiently peel off the adhesive member 31 from the support member 32, while suppressing the load applied to the adhesive member 31 and the image display unit 30. It is also possible to reduce the danger of breakage of the image display unit 30, as the load applied thereto is suppressed. Furthermore, it is also possible to minimize the load to the image display unit 30 by reducing the elevating speed of the separating units 35 after the separating unit 35 reach the adhesive member 31.

After the image display unit 30 is completely separated from the support member 32, the heater in the receiving base 33 is deactivated (Step 48), and the image display unit 30 with the attached adhesive member 31 is removed from the separating unit 35 (Step 49). Then the control unit 36 is activated to start a descent of the separating units 35, and the descending operation is terminated after the upper ends of the separating units 35 are extracted from the penetrating holes 33*a* of the receiving base 33 (Step 50). Then the attach/detaching mechanism 34 is switched to a releasing state and the support member 32 is removed from the receiving base 33 (Step 51), whereupon the disassembling operations are terminated.

In the present embodiment, as explained in the foregoing, the support member 32 is provided with the plural penetrating holes 32*a*, penetrating from a surface on which the adhesive member 31 is adjoined to the other opposed surface, and is fixed by the attach/detaching mechanism 34 and the adhesive member 31 is pressed by the plural separating units 35 respectively inserted into the plural penetrating holes 33*a* whereby the image display unit 30 and the support member 32 mutually adjoined across the adhesive member 31 can be separated into the image display unit 30 with the attached adhesive member 31 and the support member 32 on which the adhesive member 31 is no longer attached.

Such configuration of pressing the adhesive member 31 allows to reduce the load on the image display unit 30 in comparison with the case of peeling the image display unit 30 and the support member 32, whereby the danger of breakage of the image display unit 30 can be reduced and the image display apparatus can be disassembled safely and efficiently. Also in the present embodiment, since the image display unit 30 and the support member 32 can be separated without cutting the adhesive member 31, there is not generated a cut waste of the adhesive member 31 in contrast to the case of cutting the adhesive member 31, so that there is not required a step of disposing the cut waste. In the foregoing there has been explained a configuration in which the adhesive member 31 constituting the adhering member is pressed to provide the image display unit 30 with a force in a separating direction from the support member 32, but, in case the adhesive member 31 is absent in the positions impinged on by the separating units 35, there may be adopted a configuration where the separating units 35 can provide the image display unit 30 with a force in a separating direction from the support member 32, without across the adhesive member 31.

In the present embodiment, the heater is incorporated in the receiving base 33 for holding the support member 32 to heat the adhesive member 31, but there may also be adopted a configuration of installing the disassembling apparatus in a heating apparatus (heating oven) to heat the disassembling apparatus and the image display apparatus entirely.

Also in the present embodiment, the image display unit 30 is lifted by the separating units 35 from below, but there may also be adopted a configuration of utilizing suction cups (not shown) instead of the separating units 35, thereby pulling up the image display unit 30 from above.

It is also possible to adopt a configuration of installing the disassembling apparatus and the image display apparatus in a vertically standing position, attaching suction cups (not shown) to the image display unit 30, and activating the separating units 35 in the horizontal direction to pass through the penetrating holes 33*a* of the receiving base 33 and the penetrating holes 32*a* of the support member 32 thereby pressing the adhesive member 31 and separating the image display unit 30 from the support member 32. In such case, it is preferable that the movements of the suction cups and the separating units 35 are mutually linked in order to achieve smooth separating operation of the image display unit 30 and to prevent breakage of the image display unit 30 by dropping after separation.

In the present embodiment, the penetrating holes 32*a*, formed in the support member from a surface opposed to the image display unit to an opposite surface, are assumed to be formed in advance at the formation of the support member, but it is also possible, in case of disassembling an image display apparatus employing a support member without such penetrating holes, to form the penetrating holes in such support member and then to execute the above-explained disassembling method.

(Fourth Embodiment)

Figure 11:
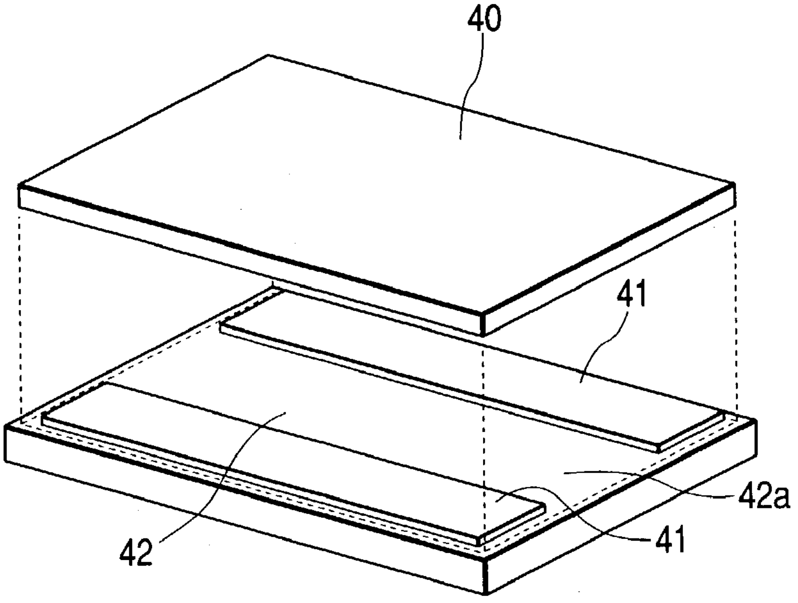
FIG. 11 is a perspective view showing an image display apparatus constituting a fourth embodiment of the present invention.

FIG. 11 is a perspective view showing an image display apparatus constituting a fourth embodiment of the invention of the present application. The image display apparatus shown in the present embodiment is particularly suitable for applying the disassembling method of the aforementioned first embodiment. In FIG. 11, the image display apparatus is illustrated in a state where the image display unit is separated upwards, in order to facilitate the understanding of the structure.

The image display apparatus of the present embodiment is provided with an image display unit 40 of a rectangular shape, in which two glass substrates bearing electrical wirings are mutually adhered to constitute a vacuum container, and a support member 42 constituted by die casting of an aluminum alloy into a predetermined shape and positioned to be opposed to the rear side of the image display unit 40. The support member 42 is provided with unrepresented ribs and bosses for increasing the rigidity of the support member 42 itself and protecting the image display unit 40 from an impact from the exterior and from a mechanical load.

A glass substrate of the rear side of the image display unit 40 and the support member 42 are mutually adjoined by an adhesive member 41, formed by coating an acrylic sticking material on both surfaces of a base member of a polyolefinic foamed material into a thickness of about 1 mm. Such adhesive member 41 is provided substantially parallel to two longer sides of the image display unit 40. Between the two adhesive members 41, there is provided no adhesive material. An area between the two adhesive members 41 (area 42*a* substantially free of adhesive member) can be used as a separating unit inserting position (separating unit can be similar to the separating unit 13 of the disassembling apparatus of the first embodiment). In case the adhesive member has sticking property at the cutting (in case the sticking property at the assembling still remains or in case the sticking property is already lost at the disassembling but is recovered by heating or contact with solvent at the disassembling), the insertion of the separating unit may become difficult if the inserted separating unit comes into contact with the adhesive member 41 having the sticking property. The configuration of the image display apparatus of the present embodiment allows to use an area 42*a* substantially free of the adhesive member as the inserting position for the separating unit. Consequently, such area 42*a* substantially free from the adhesive member is particularly preferably an area from a side (preferably a shorter side) to an opposed side in a rectangle formed by projecting a plane defined by the external periphery of the image display unit 40 onto a plane defined by the external periphery of the support member 42 (such projection being illustrated in broken lines in FIGS. 11 and 12; in case the latter (the support member 42) is smaller than the former (the image display unit 40), the latter may be projected onto the former). Also, by selecting the inserting position of the separating unit at the center of a side, the force for peeling the image display unit 40 and the support member 42 can be applied uniformly, so that the area 42*a* substantially free from the sticking member, constituting the adhesive member, is preferably present at least from the center of a side (preferably a shorter side) to that of an opposed side.

The configuration of a television set, incorporating the image display apparatus of the above-described configuration, is similar to that in the first embodiment, so that the configuration of the television set will not be explained further. Also, for disassembling the image display apparatus of the present embodiment, there is employed the disassembling apparatus of the first embodiment, so that the configuration of the disassembling apparatus will not be explained further.

In the image display apparatus of the present embodiment, having the configuration explained above, the two adhesive members 41 extending along the longer side of the image display unit 40 are positioned in the vicinity of the both longer sides of the image display unit 40, so that an area 42*a*, without the adhesive member 41 between the image display unit 40 and the support member 42, is formed in a central part of the image display unit 40, parallel to the longer sides thereof. Such area has a width of 5 cm or larger, and extends from a central part of a shorter side of the image display unit 40 to a central part of the other shorter side.

According to the configuration of the present embodiment, a contact area of the cutting unit 12 with the adhesive member 41 becomes smaller in comparison with a case where the image display unit is adhered over the entire area to the support member by the adhesive member, as shown in FIG. 1 etc. Therefore, in addition to the safe and efficient disassembling of the image display apparatus without breakage as explained in the foregoing embodiment, it is rendered possible to increase the moving speed of the cutting arm 14 (cf. FIG. 1) at the cutting of the adhesive member 41 with the cutting unit 12 (cf. FIG. 1), whereby the time required for the cutting step of the adhesive member 41 can be reduced. It is naturally more efficient to increase the width of the aforementioned area without the adhesive member 41 within an extent of maintaining the reliability of the adhesive force between the image display unit 40 and the support member 42.

Also in case the image display unit is adhered over the entire surface to the support member with the adhesive member, since a remainder of the adhesive member remains on at least either of the image display unit and the support member after the adhesive member is cut by the cutting unit 12, the separating unit 13 becomes less slidable at the insertion between the image display unit and the support member, thereby applying an additional load on the image display unit 40. On the other hand, in the present embodiment, because of the presence of the area 42*a* substantially free from the adhesive member 41 between the image display unit 40 and the support member 42, the separating unit 13 can be smoothly inserted between the image display unit 40 and the support member 42 thereby alleviating the load on the image display unit 40.

Figure 12:
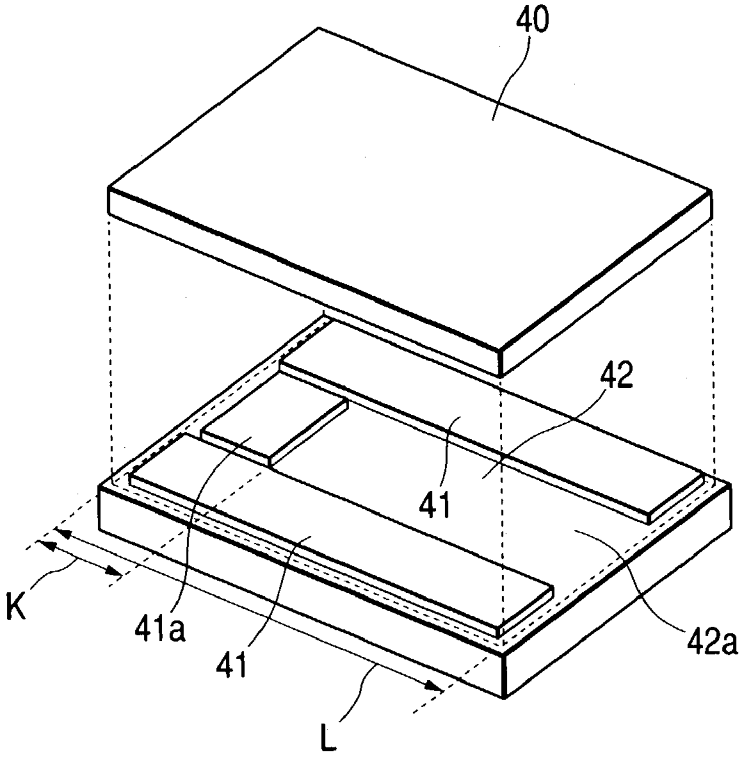
FIG. 12 is a perspective view showing a variation of the image display apparatus shown in FIG. 11.
Figure 13:
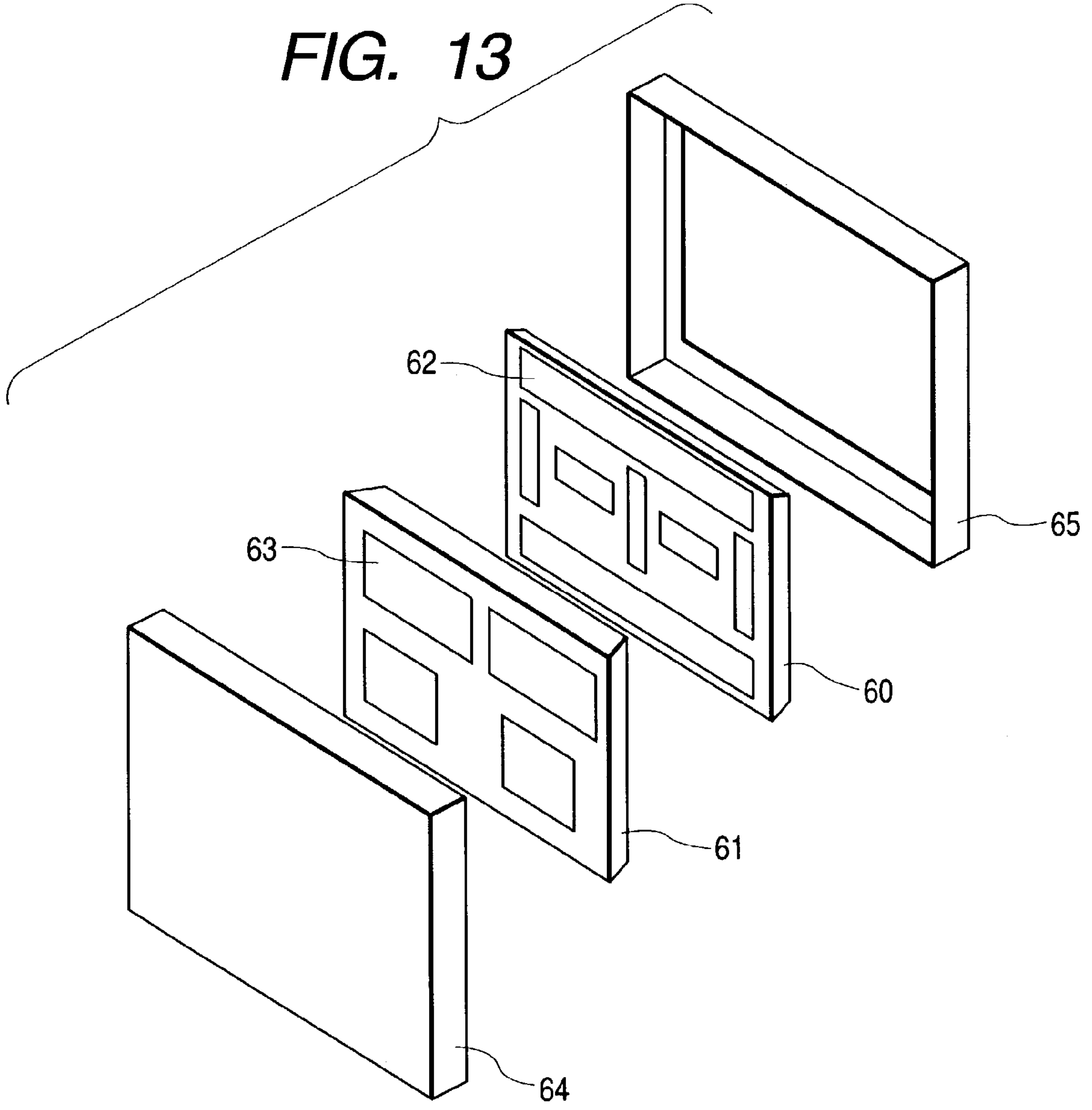
FIG. 13 is a perspective view showing a conventional image display apparatus in a disassembled state.

FIG. 12 is a perspective view showing a variation of the image display apparatus shown in FIG. 11. In FIG. 12, the image display apparatus is illustrated in a state in which the image display unit thereof is separated upwards, in order to facilitate the understanding of the structure of the image display apparatus.

In the image display apparatus of the present variation, in addition to the configuration of the image display apparatus shown in FIG. 11, a second adhesive member 41*a* is provided between the two adhesive members 41 and in the vicinity of a shorter side of the image display unit 40 opposite to the shorter side having the area 42*a* substantially free from the adhesive member. The second adhesive member 41*a* is also formed by coating an acrylic sticking material on both surfaces of a base member of a polyolefinic foamed material into a thickness of about 1 mm.

In the foregoing, it is stated that the area substantially free from the adhesive member is preferably an area extending from a side (preferably a shorter side) to an opposed side, but, since the peeling force can be more easily applied to the remaining adhered area as the separating unit is progressively inserted, such area 42*a* substantially free from the adhesive member need not necessarily extend a side of the projected area to the opposed side. Stated differently, within the area from the central part of a side of the projected area to the central part of an opposed side, the adhesive member may be present in the vicinity of such opposed side. More specifically, the adhesive member may be present in an area connecting the central parts of the mutually opposed two side, within an extent from either of the mutually opposed two sides to ⅓ of the distance of such mutually opposed two sides. Stated differently, as shown in FIG. 12, the area 42*a* without the adhesive member preferably extends from a side of the projected area indicated by broken lines to the opposed side over a distance of at least ⅔ of the distance L of the opposed two sides, thus satisfying a condition $k<L/3$. In the image display apparatus shown in FIG. 12, the second adhesive member 41*a* is provided as the adhesive member, also in the vicinity of the central part of one of the shorter sides. Such configuration, as in the image display apparatus shown in FIG. 11, allows to reduce the time required for the cutting step for the adhesive members 41, 41*a*, also to alleviate the load to the image display unit 40 at the insertion of the separating unit 13 and to increase the adhesion strength of the image display unit 40 and the support member 42 by the addition of the second adhesive member 41*a*.

In the foregoing there has been explained a case where the image display unit 40 has a rectangular shape, but the shape of the image display unit 40 may also be square (in such case, all the four sides may be regarded as shorter sides).

(Fifth Embodiment)

Figure 14:
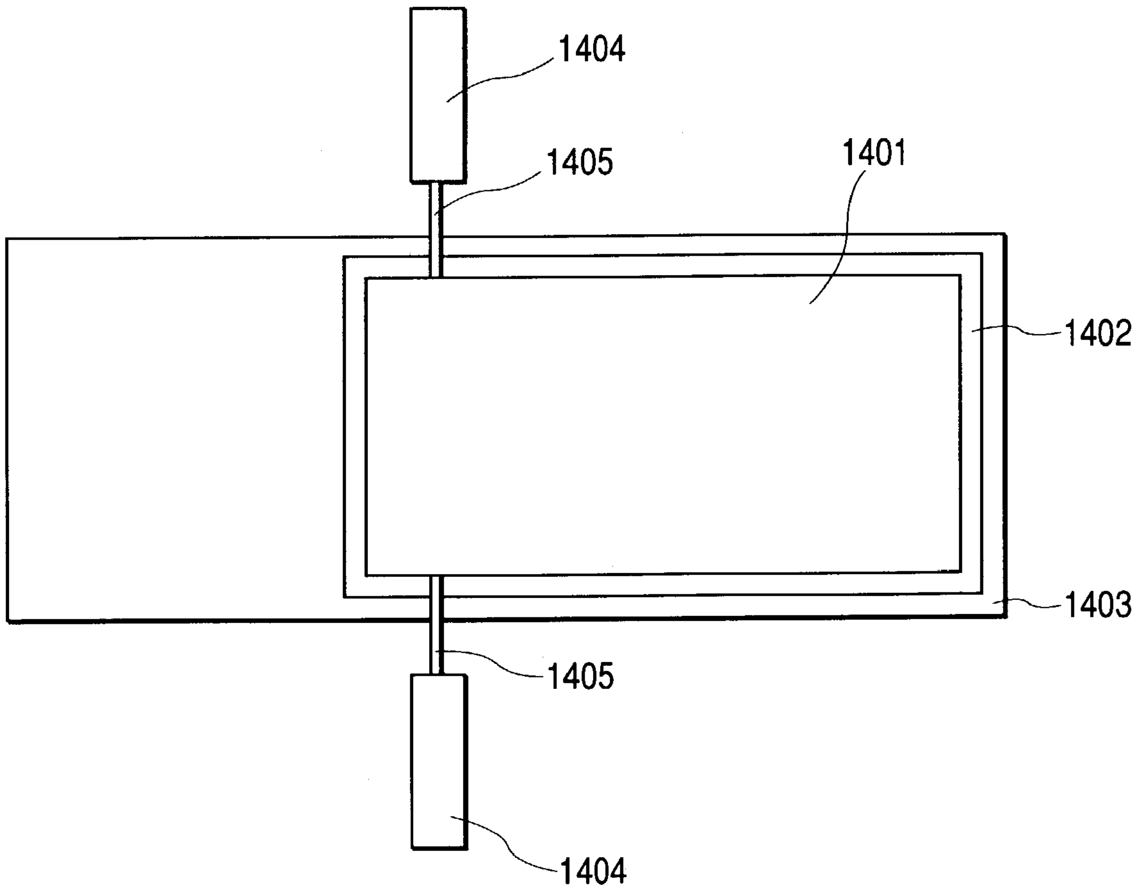
FIG. 14 is a view showing a configuration in case disassembling is executed by a water jet apparatus.

In the foregoing first and second embodiments, an elongated cutting units is employed as the substance to be inserted between the image display unit and the support member. Such cutting unit is preferably a unit having rigidity singly or a unit capable of functioning as the cutting unit when provided with a tension between two points (more specifically two cutting arms). However, there may also be adopted a configuration of introducing a particulate substance or a liquid with a predetermined energy between the image display unit and the support member and separating, by such energy, the connection of the image display unit and the support member by the adhesive member. Such embodiment will be explained in detail with reference to FIG. 14. There are shown an image display unit 1401 and a support member 1402, which are similar in configuration to those in the foregoing embodiments. A table 1403 is used for supporting and moving the support member 1402. A water jet apparatus 1404 ejects water from a nozzle, and a numeral 1405 indicates water ejected from the water jet apparatus 1404.

A disassembling method in the present embodiment is executed in the following manner.

At first an image display apparatus is placed on the table 1403. Then the position of the image display apparatus is so adjusted that the water ejected from the water jet apparatus 1404 impinges on the adhesive member (not shown) located between the image display unit 1401 and the support member 1402 of the image display apparatus.

Then the water ejection from the water jet apparatus 1404 is started, to release the connection by the adhesive member, while the image display apparatus is so moved that the area impinged on by the water moves along the longer side of the image display apparatus.

It is preferable to provide, within the area between the image display unit 1401 and the support member 1402 of the image display apparatus, particularly in a central area, an area substantially free from the adhesive member as shown in FIG. 11, thereby allowing to shorten the depth of separation by the ejection of the substance from the exterior namely the distance from the position of ejection (position of water-ejecting nozzle in case of a water jet) to the position of separation.

There may also be adopted a configuration of executing the ejection on the four sides, but, in case of executing the ejection only on two sides as in the present embodiment, there is preferred a configuration of executing the ejection on the two longer sides.

In addition to the configuration of ejecting 25, water 1405 only from the water jet apparatus 1404, there may also be adopted a configuration of ejecting fine particles (abrasive) together with water. There may also be employed a liquid other than water.

In the foregoing, the disassembling method has been explained by plural examples, but the present application includes an invention on a producing method, in addition to the invention on the disassembling method. An image display apparatus can be produced by employing the support member or the image display unit, obtained as a result of execution of the disassembling method explained in the foregoing. Such method will be explained in the following.

According to an invention, there is provided a method for producing an image display apparatus, utilizing a support member or an image display unit, obtained by the aforementioned disassembling method, as the support member or the image display unit of the image display apparatus to be produced.

In such case, the producing method for the image display apparatus can produce an image display apparatus by employing either of:

a step of assembling a support member obtained by the aforementioned disassembling method with a separately prepared an image display unit;

a step of assembling an image display unit obtained by the aforementioned disassembling method with a separately prepared support member; and a step of assembling an image display unit obtained by the aforementioned disassembling method and a support member obtained by the aforementioned disassembling method.

Thus, the invention of the disassembling method explained in the foregoing can be regarded as an invention of a producing method for the image display unit or the support member of the image display apparatus. Stated differently, an image display apparatus can be produced with the display unit or the support member, produced by the aforementioned disassembling method or the producing method of the image display unit or the support member.

Also the support member or the image display unit obtained in the aforementioned disassembling method (or the producing method for the image display unit or the support member) may be subjected to a step of rendering easily workable. Such step of rendering workable means a work for facilitating a work on the obtained support member or image display unit for producing another product.

Specific examples of such step are shown in the following:

1) A support member of an aluminum alloy, obtained in the foregoing disassembling method, is cut to obtain small pieces of the aluminum alloy; and 2) A support member obtained in the foregoing disassembling method is fused to obtain a metal ingot.

Such metal pieces or ingot can be used for producing a component.

Also in case the image display unit is formed with glass, an image display unit obtained in the foregoing disassembling method may be used as a raw material for obtaining glass carets. Also a metal used in the display unit may be taken out by fusion.

What is claimed is:

1. A method for disassembling an image display apparatus in which an image display unit and a support member for supporting the image display unit are adhered by an adhesive member, wherein the image display unit includes a front side flat substrate and a rear side flat substrate with an internal space therebetween, the method comprising the steps of:

separating the image display unit and the support member, wherein said separating step includes a step of sequentially releasing, along the front side flat substrate or the rear side flat substrate, a bond between the image display unit and the support member through the adhesive member by a wire shaped cutting unit positioned between the image display unit and the support member, wherein the step of releasing is conducted while supporting the wire shaped cutting unit by two arms disposed outside of a region sandwiched by the image display unit and the support member, wherein the adhesive member is formed from an acrylic material, and wherein the step of sequentially releasing is performed in a state that one of the image display unit and the support member is fixed, and the other of the image display unit and the support member is held by a suction cup, while applying a force for separating the image display unit from the support member by a wedge member inserted therebetween, and while heating the wire shaped cutting unit to thereby heat the adhesive member.

2. A disassembling method according to claim 1, wherein the adhesive member is cut by the wire shaped cutting unit.

3. A disassembling method according to claim 2, wherein the wire shaped cutting unit cuts the adhesive member by contact with the adhesive member.

4. A disassembling method according to claim 1, wherein the wire shaped cutting unit is a linear member.

5. A disassembling method according to claim 1, wherein the wire shaped cutting unit is a cutting blade.

6. A method for producing a support member, comprising:

a step of separating, in an image display apparatus in which an image display unit including an internal space and a support member for supporting the image display unit are adhered by an adhesive member, with the image display unit including a front side flat substrate and a rear side flat substrate with an internal space therebetween, wherein said separating step includes a step of sequentially releasing, along the front side flat substrate or the rear side flat substrate, a bond between the image display unit and the support member through the adhesive member by a wire shaped cutting unit positioned between the image display unit and the support member, wherein the step of releasing is conducted while supporting the wire shaped cutting unit by two arms disposed outside of a region sandwiched by the image display unit and the support member, wherein the adhesive member is formed from an acrylic material, and wherein the step of sequentially releasing is performed in a state that one of the image display unit and the support member is fixed, and the other of the image display unit and the support member is held by a suction cup, while applying a force for separating the image display unit from the support member by a wedge member inserted therebetween, and while heating the wire shaped cutting unit to thereby heat the adhesive member.

7. A method for producing an image display unit, comprising:

a step of separating, in an image display apparatus in which an image display unit including an internal space and a support member for supporting the image display unit are adhered by an adhesive member, with the image display unit including a front side flat substrate and a rear side flat substrate with an internal space therebetween, wherein said separating step includes a step of sequentially releasing, along the front side flat substrate or the rear side flat substrate, a bond between the image display unit and the support member through the adhesive member by a wire shaped cutting unit positioned between the image display unit and the support member, wherein the step of releasing is conducted while supporting the wire shaped cutting unit by two arms disposed outside of a region sandwiched by the image display unit and the support member wherein the adhesive member is formed from an acrylic material, and wherein the step of sequentially releasing is performed in a state that one of the image display unit and the support member is fixed, and the other of the image display unit and the support member is held by a suction cup, while supplying a force for separating the image display unit from the support member by a wedge member inserted therebetween, and while heating the wire shaped cutting unit to thereby heat the adhesive member.

8. A method for producing a working material, comprising:

a step of obtaining a support member by a disassembling method according to claim 1; and a step of rendering the support member obtained by said step easily workable.

9. A method for producing a working material, comprising:

a step of obtaining an image display unit by a disassembling method according to claim 1; and a step of rendering the image display unit obtained by said step easily workable.

* * * * *

UNITED STATES PATENT AND TRADEMARK OFFICE

CERTIFICATE OF CORRECTION

PATENT NO. : 7,150,804 B2
APPLICATION NO. : 10/322620
DATED : December 19, 2006
INVENTOR(S) : Hisao Tajima It is certified that error appears in the above-identified patent and that said Letters Patent is hereby corrected as shown below:

COLUMN 3:

Line 47, "solid-substance" should read --solid substance--.

COLUMN 8:

Line 64, "Tn" should read --In--.

COLUMN 12:

Line 64, "(Step 28)" should read --Step 28).--.

COLUMN 22:

Line 67, "members" should read --member,--.

Signed and Sealed this

Twentieth Day of May, 2008

JON W. DUDAS
*Director of the United States Patent and Trademark Office*